US011521229B2

(12) United States Patent
Lidow

(10) Patent No.: US 11,521,229 B2
(45) Date of Patent: Dec. 6, 2022

(54) SYSTEMS AND METHODS FOR MOBILE ADVERTISEMENT REVIEW

(71) Applicant: Xandr Inc., New York, NY (US)

(72) Inventor: Arel Ives Lidow, New York, NY (US)

(73) Assignee: Xandr Inc., New York, NY (US)

( * ) Notice: Subject to any disclaimer, the term of this patent is extended or adjusted under 35 U.S.C. 154(b) by 822 days.

(21) Appl. No.: 14/592,377

(22) Filed: Jan. 8, 2015

(65) Prior Publication Data

US 2015/0193810 A1 Jul. 9, 2015

Related U.S. Application Data

(60) Provisional application No. 61/925,491, filed on Jan. 9, 2014.

(51) Int. Cl.
*G06Q 30/02* (2012.01)

(52) U.S. Cl.
CPC .................. *G06Q 30/0241* (2013.01)

(58) Field of Classification Search
None
See application file for complete search history.

(56) References Cited

U.S. PATENT DOCUMENTS

| 6,667,751 B1 * | 12/2003 | Wynn | G06F 16/955 715/833 |
| 7,933,802 B2 * | 4/2011 | Plow | G06Q 30/02 705/14.4 |
| 8,275,663 B2 * | 9/2012 | Rochford | G06Q 30/02 705/14.42 |
| 9,164,874 B1 * | 10/2015 | Tomay | G06F 11/366 |
| 9,262,396 B1 * | 2/2016 | Rodriguez Valadez | G06F 16/957 |
| 2007/0300179 A1 * | 12/2007 | Friedlander | G06Q 10/10 715/781 |

(Continued)

FOREIGN PATENT DOCUMENTS

JP 5559095 B2 * 7/2014 ............. G06Q 30/02

OTHER PUBLICATIONS

Doyle, Sam, "How to block Infolinks in text advertisements", archived on Jul. 13, 2013, http://botcrawl.com/how-to-block-infolinks-in-text-advertisements-from-your-internet-browser/.*

(Continued)

*Primary Examiner* — Kambiz Abdi
*Assistant Examiner* — Scott Snider
(74) *Attorney, Agent, or Firm* — Calfee, Halter & Griswold LLP

(57) ABSTRACT

A method and system for capturing and reviewing advertisement information on a mobile device are provided. An advertisement is requested to be served to a user of an application on a user device and, in response to the request, the advertisement and metadata associated with the advertisement are received at the device. The application presents the received advertisement, and a visual representation of the advertisement is captured. Specifically, the visual representation depicts the advertisement as it was originally displayed to the user. The visual representation and associated metadata are stored on the user device for subsequent retrieval. Further, an interface control is provided that allows the user to ban a particular advertisement from being shown again across multiple devices.

20 Claims, 6 Drawing Sheets

(56) References Cited

U.S. PATENT DOCUMENTS

| | | | | |
|---|---|---|---|---|
| 2008/0262914 | A1* | 10/2008 | Suveyke | G06Q 30/0256 705/14.54 |
| 2009/0234711 | A1* | 9/2009 | Ramer | G06F 17/30749 705/14.66 |
| 2010/0145762 | A1* | 6/2010 | Coladonato | G06Q 30/02 705/14.4 |
| 2010/0268609 | A1* | 10/2010 | Nolet | G06Q 30/0251 705/14.71 |
| 2011/0313850 | A1* | 12/2011 | Hahn | G06Q 30/0246 705/14.45 |
| 2011/0314343 | A1* | 12/2011 | Hoke | G06F 11/3672 714/45 |
| 2012/0042281 | A1* | 2/2012 | Green | G06F 9/454 715/764 |
| 2012/0173315 | A1* | 7/2012 | Martini | G06Q 30/0241 705/14.4 |
| 2014/0075344 | A1* | 3/2014 | Bentrup | G06F 11/323 715/760 |
| 2014/0229271 | A1* | 8/2014 | Clapp | G06Q 30/0245 705/14.44 |
| 2015/0051968 | A1* | 2/2015 | Sotelo | G06Q 30/0277 705/14.45 |
| 2016/0007083 | A1* | 1/2016 | Gurha | H04N 21/25808 725/13 |
| 2017/0316431 | A1* | 11/2017 | Goodhart | G06Q 30/0201 |
| 2017/0316465 | A1* | 11/2017 | Titus | G06Q 30/0276 |

OTHER PUBLICATIONS

Palant, Wladimir, "Adblock Plus and (a little) more", archived on Aug. 29, 2011, http://web.archive.org/web/20110829114530/https://adblockplus.org/development-builds/firefox-sync-support-added.*

Zafra, Arnold, "Google is Testing a New AdSense Interface", Nov. 5, 2009, Search Engine Journal, https://web.archive.org/web/20120420172827/https://www.searchenginejournal.com/google-is-testing-a-new-adsense-interface/14448/ (Year: 2009).*

Google, "Ad Review Center overview", archived Jul. 22, 2013, https://web.archive.org/web/20130722204120/https://support.google.com/adsense/answer/2369326?hl=en# (Year: 2013).*

Interactive Advertising Bureau, "Guidelines for the Conduct of Ad Verification", Feb. 14, 2012 (Year: 2012).*

* cited by examiner

SYSTEMS AND METHODS FOR MOBILE ADVERTISEMENT REVIEW

CROSS-REFERENCE TO RELATED APPLICATION

This application claims priority to and the benefit of U.S. Provisional Patent Application No. 61/925,491, filed on Jan. 9, 2014, and entitled "Methods and Apparatus for Reviewing Mobile Application Advertisements," the entirety of which is incorporated by reference herein.

BACKGROUND

The present disclosure relates generally to online advertisement quality review and, more particularly, to systems and methods for providing an interface to capture and review information relating to online advertisements displayed on a mobile device.

Mobile applications provide valuable venues for exposing mobile users to advertising content, and mobile developers frequently incorporate functionality into their applications that allows such advertisements to be served to mobile application users. However, these developers generally do not maintain complete control over the ads that are presented to users and, in many cases, developers have limited information about the ads served through their applications.

In some existing approaches, developers or users of a mobile application use a network trace to view requests and responses to and from different ad servers, and the response from a particular server can then be correlated to an ad seen in the application. However, setting up a network trace requires expert knowledge of networking technology, and is not always possible if requests are made through a secure connection or a carrier (e.g., AT&T).

In other approaches, developers log into an interface or an application programming interface (API) built on an ad server to view a list of ads served within their applications. However, ad servers that provide a history of ads shown are generally incomplete. The majority of the ads are often requested from a separate server, and it is often difficult or impossible to determine how each ad was shown on a particular device. Further, if a user were to complain about a specific ad, the developer would need to sift through thousands of ads to track down that specific ad and block it.

BRIEF SUMMARY

Systems and methods are described for capturing and reviewing information relating to online advertisements displayed on a mobile device. These techniques lend themselves to situations in which the ability to obtain information about ads served via a mobile application would be useful. For example, an application user may desire to review an advertisement recently seen in the application. In another situation, a developer or application user may see an advertisement that they dislike (e.g., an ad having distasteful content or an ad from a competitor), and may desire to block the ad from displaying in the application in the future. However, in order to do so, further information is generally required about the ad at issue, such as which ad network or advertiser targeted the ad to the mobile application. As another example, an ad may not render or display correctly, and the app developer or an advertiser may want to remedy the defect. To do so, the developer or advertiser will need certain diagnostic information, such as the underlying ad markup (HTML) or information about the request and response to/from the server that provided the ad.

The implementations described herein facilitate the management of advertisements that serve on impression inventory in mobile applications by application developers/users, ad publishers, and ad platform servicers. These techniques make it simple for any of the aforementioned parties to determine which ads have been served in a mobile application, do not require expert knowledge of networking technologies, and allow access to relevant data in a user-friendly way within seconds. Further, the present approach allows users, developers, and others to quickly find an ad shown on a particular device, as well as to see all ads shown recently in an application, versus a small subset of ads.

Accordingly, in one aspect, a computer-implemented method includes the steps of: requesting an advertisement to be served to a user of an application on a user device; receiving, in response to the request, the advertisement and metadata associated with the advertisement; presenting the received advertisement in the application; capturing a visual representation of the advertisement as presented in the application; storing the visual representation and associated metadata for subsequent retrieval; and providing an interface control configured to allow a user to ban the advertisement from being displayed on a plurality of user devices.

In one implementation, the user device is a mobile device and the application is a mobile application. The metadata can include information associated with an auction that resulted in the advertisement being served to the user. The visual representation can include a screenshot including the advertisement and at least a portion of an area surrounding the advertisement, and the visual representation of the advertisement can be automatically captured after a fixed delay.

In another implementation, the method further includes providing a software development kit for use with the application, where the software development kit is configured to provide the requesting and the capturing. A graphical user interface can also be included for displaying and facilitating review of captured visual representations of advertisements previously displayed in the application. The method can further include receiving, at the user device, an interaction from the user, and enabling the graphical user interface in response to the interaction. The interaction can be a gesture on a touch-based input device and/or a selection of an interface control graphically overlaid on the advertisement.

In a further implementation, the graphical user interface is further configured for displaying metadata associated with the advertisements previously displayed in the application. The interface control can also be configured to allow the user to ban other advertisements associated with a brand of the advertisement from being displayed on a plurality of user devices.

Other implementations of the foregoing aspects include corresponding systems and computer programs. The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
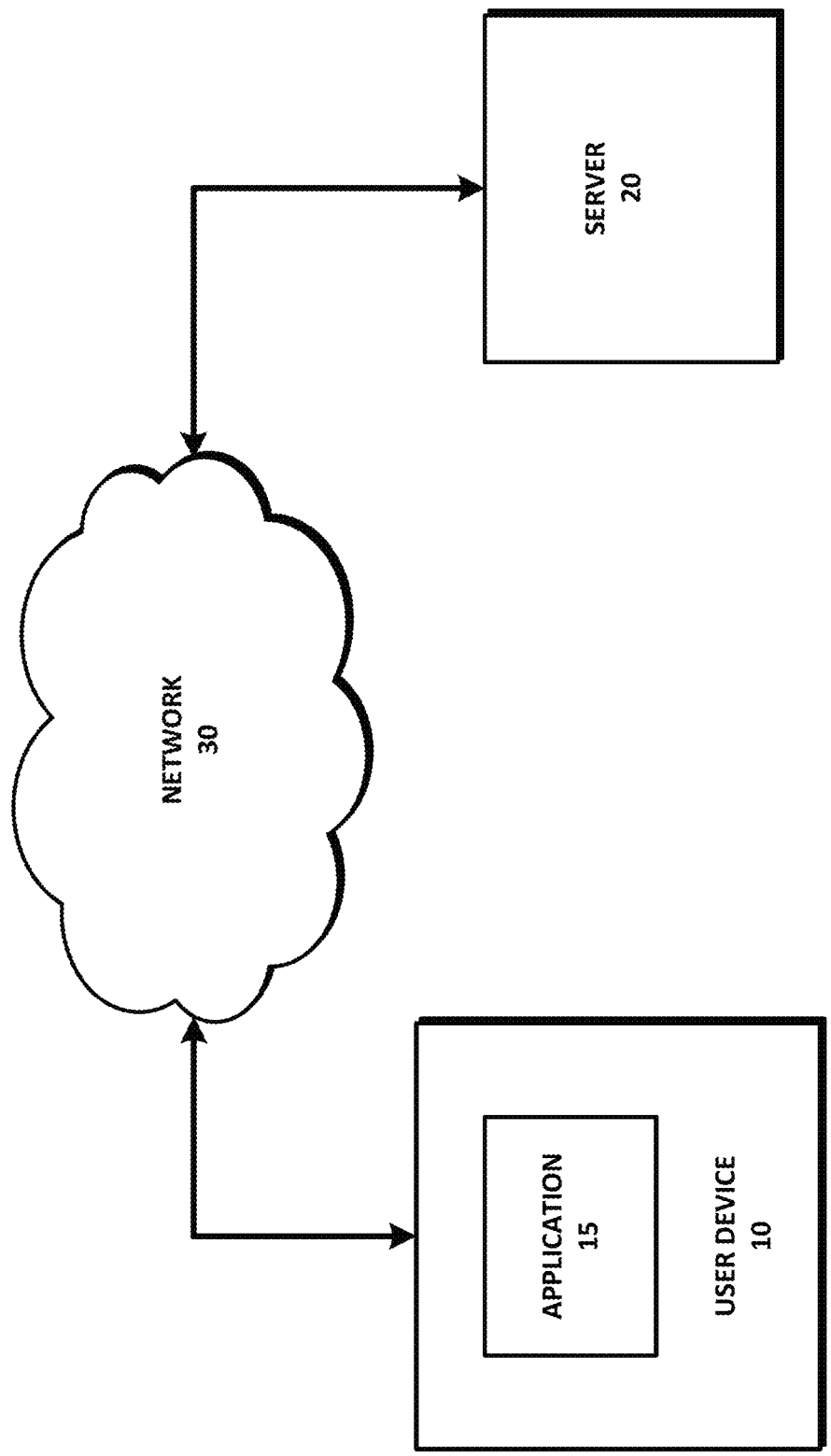
FIG. 1 depicts an example system and network architecture according to an implementation.

Described herein in various implementations are systems and methods for capturing and reviewing information relating to online advertisements displayed on a mobile device. Referring to FIG. 1, in one implementation, an application 15 executes on a user device 10. The user device can be, for example, a mobile device, a smart phone, tablet computer, smart watch, smart glasses, portable computer, mobile telephone, laptop, palmtop, set-top box, gaming device, music device, television, desktop computer, smart or dumb terminal, network computer, personal digital assistant, router, DVD player, wireless device, information appliance, workstation, minicomputer, mainframe computer, or other computing device, that is operated as a general purpose computer or as a special purpose hardware device that can execute the functionality described herein.

A particular application 15 can be, for example, a web browser, a mobile app, a game, or other application that is capable displaying advertisements to a user. The application 15 can be implemented in various forms, for example, it can be in the form of a native application, web page, widget, and/or Java, JavaScript, .Net, Silverlight, Flash, and/or other applet or plug-in that is downloaded to the device and runs in conjunction with a web browser. Examples of commercially available web browser software include Microsoft® Internet Explorer®, Google® Chrome®, Mozilla® Firefox®, and Apple® Safari®.

The application 15, through the user device 10, can communicate with server 20 via communications network 30. Server 20 can utilize appropriate hardware or software and can execute, for example, on one or more server class computers that have sufficient memory, data storage, and processing power and that run a server class operating system (e.g., Oracle® Solaris®, GNU/Linux®, and the Microsoft® Windows® family of operating systems). In one implementation, server 20 is an advertising server that serves or otherwise sources creatives for display in application 15 on user device 10.

Software operating on user device 10 and/or server 20 can be implemented on a general purpose computing device in the form of a computer including a processing unit, a system memory, and a system bus that couples various system components including the system memory to the processing unit. Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. The processor and the memory can be supplemented by, or incorporated in special purpose logic circuitry.

User device 10 and/or server 20 can also include information carriers suitable for embodying computer program instructions and data, including various forms of non-volatile memory such as semiconductor memory devices (e.g., EPROM, EEPROM, and flash memory devices), magnetic disks (e.g., internal hard disks or removable disks), magneto-optical disks, and CD-ROM and DVD-ROM disks.

Communication network 30 can include communications media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are contemplated. The network can carry TCP/IP protocol communications, and HTTP/HTTPS requests made by a web browser, and the connection between the client device and servers can be communicated over such TCP/IP networks. Other communication protocols are contemplated.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

The system and methods described herein can also be practiced in distributed computing environments, where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The present techniques can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 2:
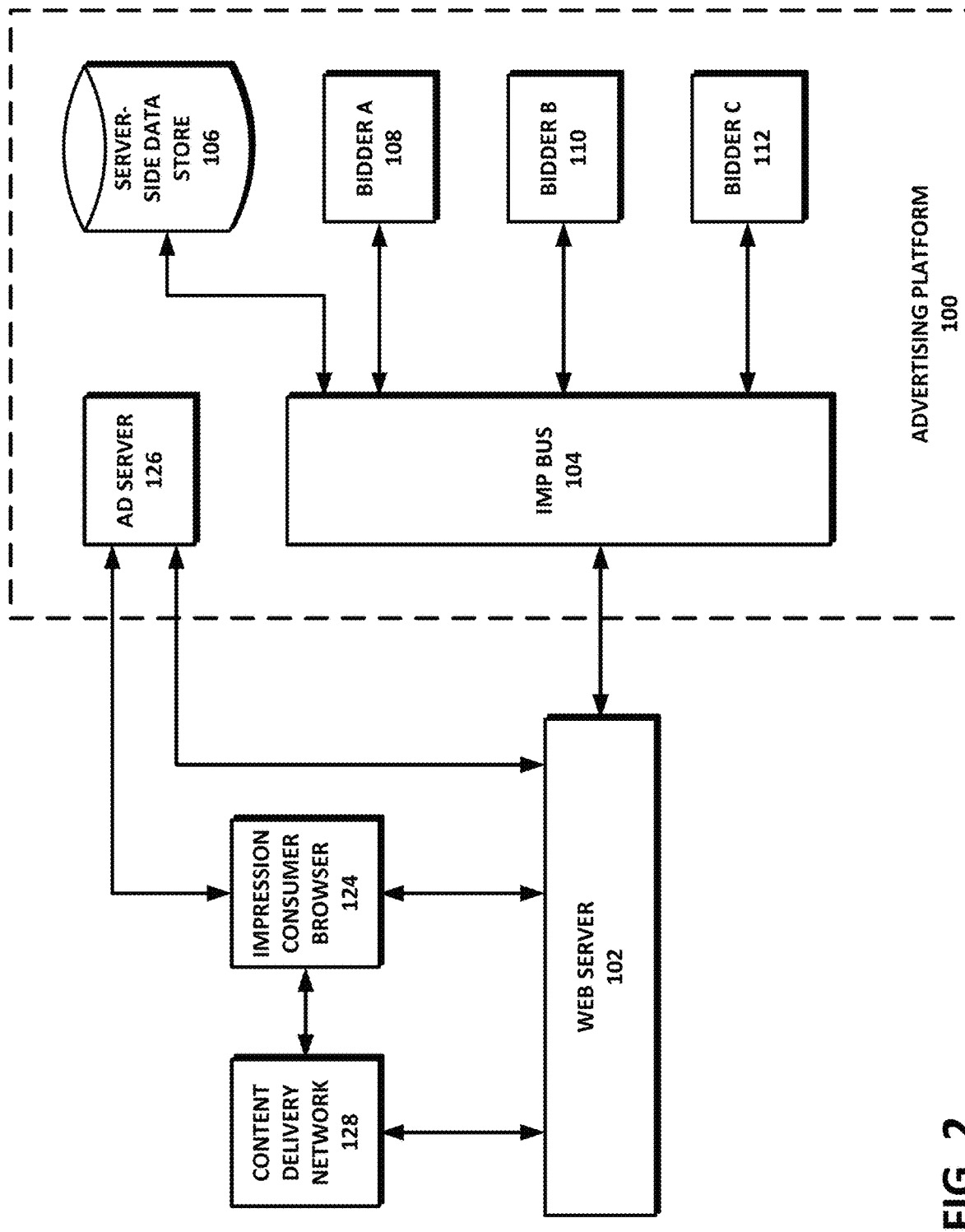
FIG. 2 depicts an example system architecture for an advertising platform according to an implementation.

In one implementation, server 20 is an advertising server or an online advertising platform server that servers or facilitates the serving of advertisements to an impression consumer (e.g., a user of user device 10). For example, referring to FIG. 2, server 20 can be a server in advertising platform 100. As shown, an advertising platform 100 that provides for the execution of real-time bidding auctions for impression inventory and eases collaboration among members of the online advertising industry can include a platform impression bus 104 (also referred to herein as the "Imp Bus") that facilitates the transactional aspects of impression inventory trading. In general, the Imp Bus 104 processes ad requests, feeds data to platform members, conducts impression auctions, returns ads to publishers, tracks billing and usage, returns auction result data, and enforces quality standards.

Parties that interface with the advertising platform 100 can include impression sellers, which are persons or entities that sell impression inventory (e.g., available ad space on websites, in mobile applications, etc.) and impression buyers, which are persons or entities that purchase impression inventory and can serve creatives (e.g., images, videos, and other forms of advertisements) in the purchased inventory to impression consumers. Impression buyers can include advertisers, advertising networks, advertising agencies, advertising exchanges, and publishers. In an auction for an impression, an impression buyer can bid for the impression using a computer-based bidder that receives as input various data related to the impression, the impression consumer, and/or other data and generates as output a bid price.

In some implementations of the advertising platform 100, a server-side data store 106 within the platform 100 stores data associated with particular impression consumers (e.g., demographics, ad viewing history, etc.), which can be used as input to bidders in impression auctions when a recognized impression consumer is the target audience. In general, data that is stored in association with impression consumers can be supplemented over the course of time as the impression consumers interact with web delivery engines within the platform.

In some implementations, all data stored in association with a particular impression consumer is shared among all parties interfacing with the advertising platform 100, whereas, in other implementations, mechanisms limit access to the data stored in association with a particular impression consumer based on certain criteria. For example, certain impression trading industry members may have contractual agreements that provide for sharing of data stored in association with a particular set (or sets) of impression consumers. In another example, the advertising platform 100 provides functionality that relies on impression consumer data created by or derived from information generated by unrelated parties, but does not permit the data and/or underlying information to be shared among the parties absent other agreement.

In one implementation of the advertising platform 100, each bidder is assigned a client-side data store (e.g., cookie space) in each impression consumer's browser. A bidder can freely push and pull data into or out of its own client-side data store on each impression or pixel call. For instance, a bidder may wish to track the number of times a creative has been shown to a particular impression consumer or the most recent time an ad was shown to that consumer. The data pushed into a particular bidder's client-side data store is passed into requests for that bidder only, absent an agreement to allow the sharing of data with other bidders.

In one example of operation, an impression seller hosts a website on a web server 102. The website can provide a number of creative serving opportunities, each of which can be associated with a platform-specific ad tag. The web server 102 receives requests for webpages generated by an impression consumer's web browser 124. If a requested page includes one or more creative serving opportunities, the web server 102 makes an ad call to the advertising platform 100 by redirecting the page request to the Imp Bus 104. The Imp Bus 104 can examines a browser header of the page request to determine if information identifying the impression consumer (e.g., an identifier stored in cookie space) is included therein.

If the impression consumer is identified, the Imp Bus 104 can retrieve information associated with the consumer from a server-side data store 106 within the advertising platform 100. The Imp Bus 104 or other platform subsystem generates one or more bid requests that each provide characterizations of one or more of the creative-serving opportunities on the requested page. In general, a particular bid request can include information that characterizes the impression consumer (e.g., based on data retrieved from the server-side data store 106) and the ad space (e.g., based on information associated with the platform-specific ad tag itself, such as data identifying and/or characterizing the impression, the impression seller, or the impression inventory source, and so on). A unique bid request can be created for each bidder or, if sharing of data is permitted between one or more bidders, those bidders can be sent the same bid request.

The Imp Bus 104 sends the bid requests to each respective bidder 108, 110, 112 within the platform 100. The information included in each bid request can be used by each bidder 108, 110, 112 to generate a real-time bid response on behalf of an impression buyer or buyers associated with each bidder 108, 110, 112 and to return bid responses to the Imp Bus 104. Each bid response identifies a bid price and a creative that is to be served to the impression consumer should the bid be identified as the winning bid of the platform-based auction. In the instance where a particular bidder is associated with multiple impression buyers, the bidder can conduct an internal auction to identify a winning bid from amongst the eligible campaigns of its associated impression buyers, and to generate a bid response for the platform-based auction based on the result of the internal auction.

The Imp Bus 104 identifies a winning bid from among the bid responses returned by the bidders 108, 110, 112. Although, in many instances, the winning bid is the bid associated with the highest dollar value, and the best price for a creative serving opportunity is the price that yields the highest revenue for the impression seller, there are instances in which the winning bid and the best price are based on other metrics, such as ad frequency. The Imp Bus 104 returns a uniform resource locator (URL) that identifies the location of a creative associated with the winning bid to the web server 102. In the depicted example, the web server 102 returns the requested page to the impression consumer's web browser 124, which, using information provided in the page, retrieves the ad creative to be served from an ad server 126 within the platform 100 or a server of a content delivery network 128.

In some implementations of the advertising platform 100, an impression buyer provides information, or metadata, that characterizes each ad creative that is served in response to ad calls from the platform 100, and such information can be stored within the platform 100. The information can include, for example, attribute information and other metadata that characterizes the type, dimensions, content, etc., of the ad creative, and information (e.g., a redirect to a content delivery network) that identifies where the ad creative can be retrieved from. In other implementations of the advertising platform 100, the advertising platform provider determines some or all of these attributes.

In some implementations, the creatives that are served in response to ad calls are required to conform to certain standards relating to, for example, legality, decency, and common sense, and/or are categorized by content or other attributes. As one example, creatives that promote gambling; portray partial or complete nudity, pornography, and/or adult themes or obscene content; promote get-rich-quick schemes; and so on, can be grouped into particular defining categories so that impression buyers (e.g., publishers) can permit or deny ads having such content to be served in the buyer's impression inventory on a category-by-category or ad-by-ad basis. Some ad content, such as those that depict libelous, violent, tasteless, hate, defamatory, or illegal content; are deceptive or purposely mislabeled; or spawn pops, simulate clicks, or contain malicious code, viruses, or executable files can, in some instances, can be prohibited by impression buyers altogether. Using the techniques described herein, permitting and banning of particular ads and/or categories of ads can be extended to application users and developers in addition to impression buyers.

In some implementations, ad profiles are maintained for impression sellers, developers, and/or application users that review and permit/ban creatives. An ad profile can include information relating to choices made with respect to particular ads, brands, ad categories, and so on, such as which are permitted to be displayed in application 15, or which are permitted to run on a publisher's inventory. An ad profile can be stored locally on user device 10 and/or on a server in, for example, advertising platform 100. In some instances, if no ad profile exists, all creatives are by default permitted to be displayed in application 15.

In one implementation, an ad profile includes three elements: advertisers, brands, and creatives. Advertiser- and brand-level approval standards can be used to reduce the number of creatives that need to be explicitly approved. For instance, when setting up the ad profile, a user can choose "trusted" for advertisers or brands that the user believes will always present acceptable ads. If an advertiser or brand is marked as "trusted," all creatives of that advertiser or brand are permitted to be shown by default, mitigating the need to audit each creative. However, the user can override this default by reviewing the creatives and banning any individually. The user can mark other advertisers or brands as "case-by-case," meaning that none of the creatives of that advertiser or brand will run until explicitly approved by the user. The user can also mark advertisers or brands as "banned," in which case none of the creatives of the banned advertiser or brand will be shown.

In one implementation, online advertising platform 100 and/or user device 10 store information associated with ads previously served within application 15. The information can include, for example, one or more screenshots of the previously served ads. Information relating to a fixed number of ads can be stored (e.g., screenshots and metadata associated with the previous 5, 10, 20, 100, 1000, or more ads served to the application 15) or, alternatively, information relating to a number of ads served within a certain time period can be stored (e.g., screenshots and metadata associated with ads served to the application 15 within the last day, 3 days, 10 days, 30 days, 180 days, etc.). Metadata can be stored in association with each ad indicating, for example, who served the ad, the request that generated the ad, information related to an ad auction that resulted in the ad being served, the price paid for the impression, the time when the ad was served, ad markup language, and so on. By storing screenshots of the advertisements, an app developer/user, platform user, publisher, or other party is provided not only with a visual history of ads served, but also a precise visual indication of how the ads were displayed on the user device 10 (e.g., format, position, size, and/or other visual characteristics).

Figure 3:
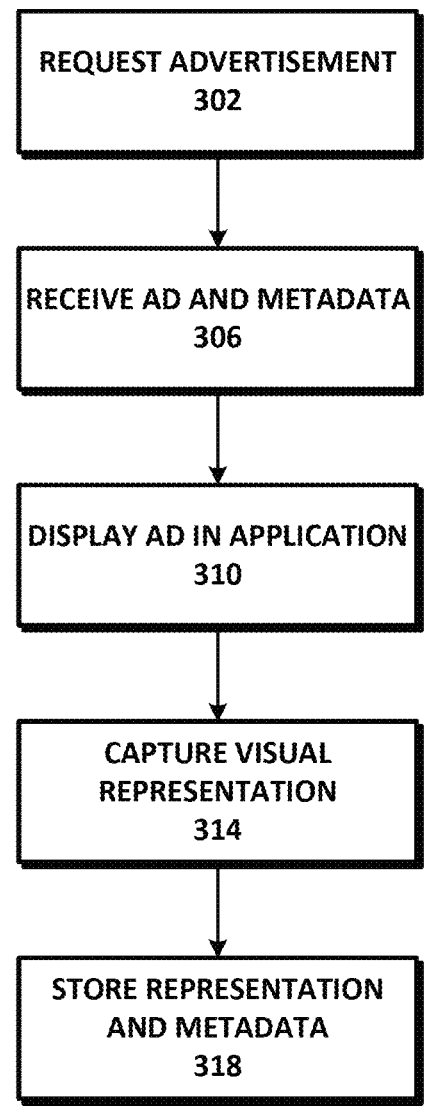
FIG. 3 is a flowchart depicting a method for capturing information associated with a served creative according to an implementation.

Referring to FIG. 3, in one implementation the application 15 executing on user device 10 makes a request (e.g., to advertising platform 100) for an advertisement to be served in to the application 15 (STEP 302). The ad requesting functionality can be provided by a software development kit (SDK) that the developer of the application 15 can integrate into the application 15. The SDK can be a code library including an application programming interface that allows the application 15 to communicate with the advertising platform 100 to request and receive advertisements. Further, the SDK can provide for the capturing, storage, and review of served advertisements via the user device 10, as further described below.

Following an ad request, the ad platform 100 (e.g., via ad server 126), content delivery network 128, or other advertisement source can respond with a creative to be served in the application 15 as well as, in some cases, metadata associated with the creative, and the creative and metadata can be received and stored at the user device 10 (STEP 306). Metadata can include, but is not limited to, the name of the advertiser, a unique identifier for the ad impression which can be used to cross-reference with other data logged by the server, and other metadata as described herein. The metadata can be encrypted so that it cannot be intercepted or used in an unintended way by a user of the application 15. The SDK can record the metadata, latency information (e.g., how long each request took), as well as the HTTP request and response associated with each request to retrieve an ad. In some implementations, some or all of the data recorded by the SDK is tied to a single "Request ID" or other unique identifier used to uniquely identify the process of retrieving an ad, which, in some circumstances, entails requests to multiple servers.

Upon receipt of the advertisement at the user device 10, the SDK or other functionality provided by the application 15 or other software on the user device 10 renders the advertisement in the application 15 such that the ad is visible to the application user and, in some cases, can be interacted with (STEP 310). Further, once the ad has been rendered and is viewable by the user, the SDK captures a visual representation (e.g., an image or screenshot) of the ad as the user sees it (STEP 314). The visual representation can include the ad image itself as well as some or all of what else is visible to the user on the device screen. This allows a visual representation to be saved for not just the ad, but the context, positioning, sizing, formatting, etc. of the ad as well. The visual representation can be captured after a delay (e.g., 1 second, 3 seconds, 5 seconds, etc.) after the ad is displayed to the user to avoid interference with other processing or allow sufficient time for other elements in the application to load. For example, if the user is playing a game and the CPU is being used to capacity, the SDK can wait until the CPU has excess processing capacity to minimize the impact on the user's experience.

In STEP 318, the SDK stores the visual representation (and, in some cases, any associated metadata) in a local database associated with the "Request ID". The visual representation may have been captured previously at a low resolution or can otherwise be compressed or changed in format prior to storage to decrease the amount of storage space required. At the instant that the SDK records or stores the screenshot or, at a later time, the SDK can also purge old data. For example, the SDK can be configured to record a specific number of visual representations, or to retain such data for up to a specific amount of time.

In some implementations, the application 15 or other software on the user device 10 provides a user interface that displays information about recent ads that have been served in one or more applications on the device 10. The interface can be activated by, for example, a special gesture on a touchscreen or other input device, the selection of an icon or other marker on an advertisement, or other appropriate interaction. The interface can be displayed using a web browser or other application on the user device 10. Functionality for the user interface can be provided using the SDK described herein.

Figure 4:
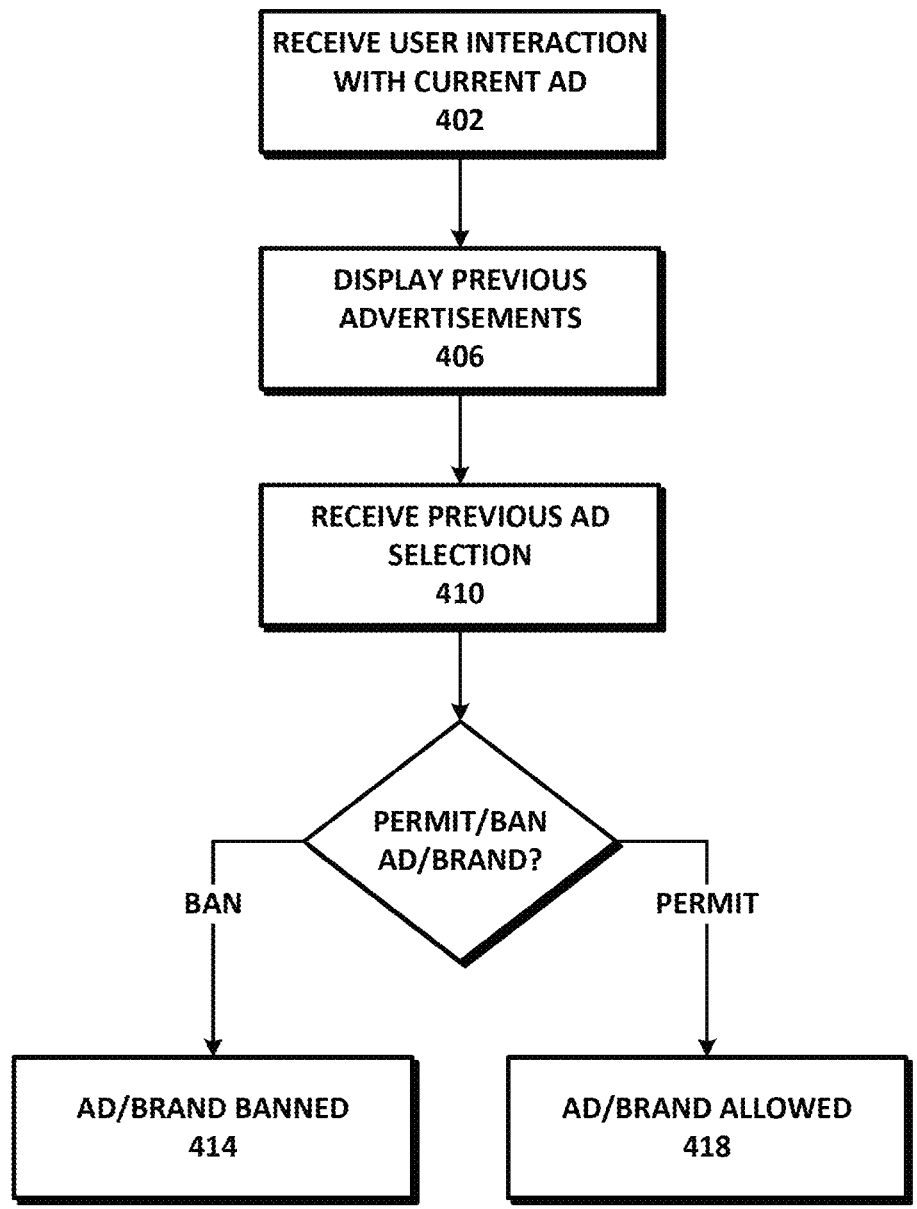
FIG. 4 is a flowchart depicting method for reviewing information associated with a served advertisement according to an implementation.

Referring to FIG. 4, if a publisher, developer, or other user desires to view a visual history of ads shown in a particular application, group of applications, or all applications on user device 10, they can activate the user interface to show the history by initiating an interaction with the user device hardware or software (e.g., a touchpad gesture, such as pressing and holding down or swiping on a specific ad spot within the application 15; selecting a link within the application 15; selecting an icon or other text or graphic overlaid on an ad shown within the application 15; or other suitable interaction). The interacting user can be prompted to enter a password, which can be verified with the advertising platform 100. If the password is correct, the user is permitted to view information about ads shown previously within the application 15 or group of applications. If metadata associated with the advertisements is encrypted, the password can be used to decrypt the metadata.

In STEP 402, the SDK receives an indication of the user interaction. In response to the interaction, the SDK causes a dialog, window, screen, or other interface to be shown on the device 10, which displays information about ads previously shown on the device 10 and/or within applications on the device 10 (STEP 406). In one instance, the user interaction is a click or tap of an icon, thumbnail, or other image overlaid on a creative, and the user interface displayed in response to the interaction provides detailed information about that creative, the impression during which the creative served, the auction that led to the impression, and so on. In some implementations, if the user is a publisher or other impression seller, the user interface can display information about ads previously served to the seller's impression inventory, regardless of the destination application or device.

The user can be provided with some or all of the metadata associated with each ad, such as the HTML content or other code that causes the ad to be rendered, as well as images of the ad reflecting how the ad was originally presented in the application 15. While reviewing the history of ads, the user can select a particular ad or group of ads (STEP 410) and can take actions such as banning ads associated with a brand or advertiser, or a particular advertisement, from being shown again (e.g., display or served) in the application 15 or multiple applications on the device 10 (STEP 414). The user can also unban, or permit, previously banned ads to be shown (e.g., displayed or served) again in the future (STEP 418). If the user is a publisher or other impression seller, the seller can ban (or unban) ads from the seller's impression inventory irrespective of the application or device where the ad may be served; thus, the seller can effectively ban/unban particular creatives (individually and/or associated with particular brands) across multiple applications and devices. In addition, the user can note the Request ID for a particular previously shown advertisement, which can then be reported to the developer or to the advertising platform 100 to investigate any issues with the particular ad.

Figure 5B:
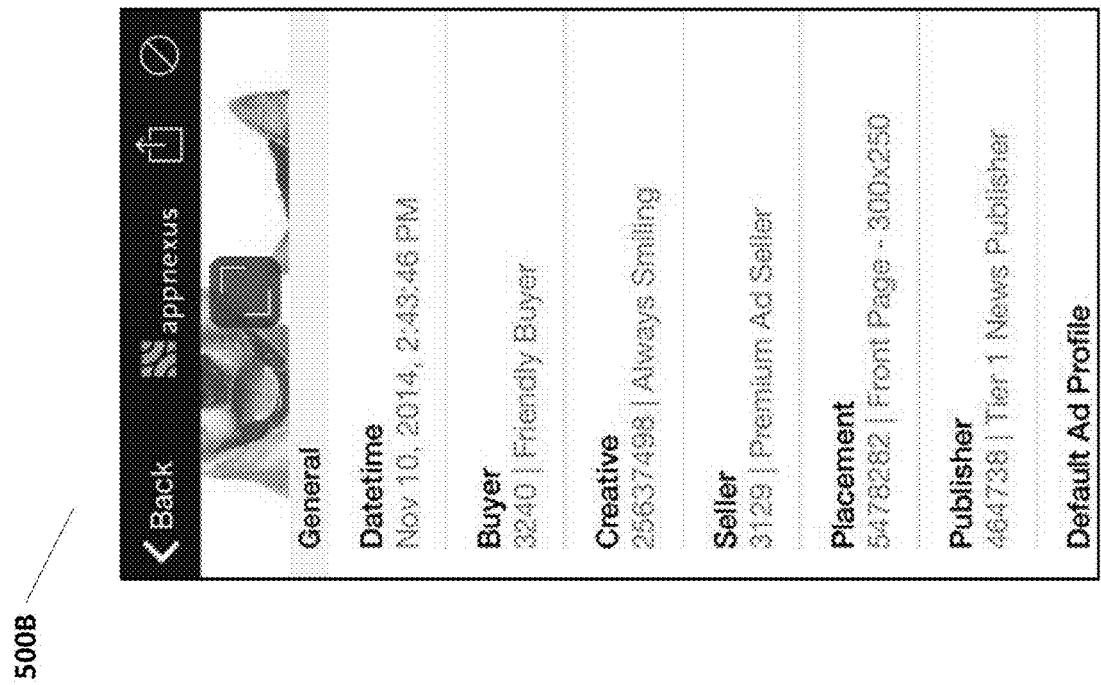
FIGS. 5A-5D are example user interface screens depicting an interface for reviewing information associated with served advertisements according to an implementation.
Figure 5A:
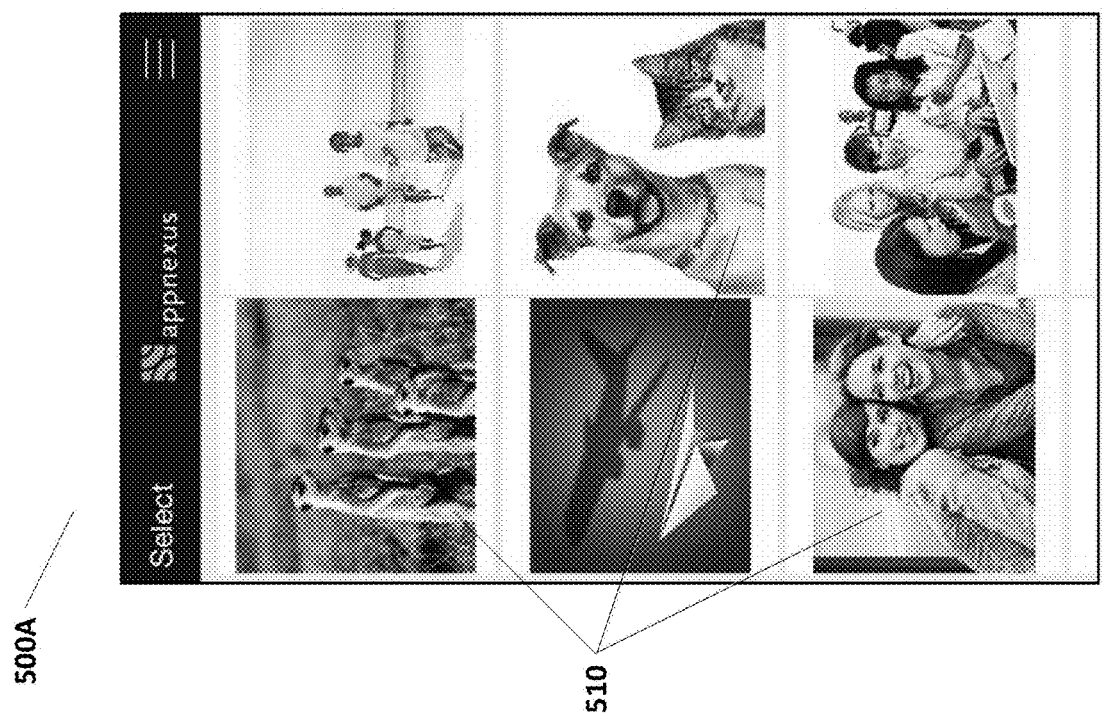

FIGS. 5A-5D depict various screens of one implementation of a graphical user interface for reviewing and sharing information associated with advertisements served in a mobile application on a mobile device, in accordance with the techniques described herein. Referring to FIG. 5A, interface screen 500A depicts a visual history of creatives 510 having been previously served (e.g., in a particular application, in multiple applications on a particular device, or across a publisher's impression inventory). In the depicted implementation, thumbnails of the creatives 510 are arranged on the interface screen 500A and can be individually selected to display additional information about the selected creative. Other arrangements and representations of the creatives 510 are contemplated; for example, the visual history can include textual descriptors or can be arranged in a list form.

In FIG. 5B, interface screen 500B displays detailed information (metadata) relating to a particular creative upon selection of the creative in the visual history or upon interaction with the particular creative as it is served (e.g., by tapping on an icon overlaid on a corner of the creative). The metadata associated with the creative can include, but is not limited to, the attributes in Table 1. Different metadata can be provided depending on the user interacting with the interface; for example, an impression seller can be given access to additional details about creatives serving on that seller's inventory than, for example, a developer or typical application user.

TABLE 1

| Attribute | Description |
| --- | --- |
| Date/Time | The date and time at which the auction resulting in the creative being served occurred. |
| Buyer | The purchaser of the impression. |
| Creative | The creative that served on the impression (e.g., the name and unique identifier associated with the creative). |
| Seller | The seller of the impression. |
| Placement | The name and unique identifier of the placement from which the impression was shown. |
| Publisher | The name and unique identifier of the publisher on whose inventory the impression was shown. |
| Default Ad Profile | This ad quality profile applied to all of the impressions on a seller's inventory. |
| Ad Profile | The specific ad profile applied to the particular impression (in addition to the Default Ad Profile). |
| Brand | The brand of the creative that served on the impression. |
| Auction ID | A unique identifier of the auction in which the impression was sold. |
| User ID | A unique identifier of the user who viewed the impression. |
| Size | The size of the creative that served on this impression (e.g., image size, file size). |
| Language | The language of the creative that served on the impression. |
| Winning Price (Bid) | The amount bid by the winning buyer of the impression. |
| Reserve Price | The reserve price, if any, put in place by the seller for the placement. |
| Currency | The currency in which the impression was purchased. |
| Number of Bids | How many bids were sent in the auction for the impression. |
| Media Type | The media type of the creative. |
| Technical Attributes | Technical attributes of the creative listed by name and identifier. For example, Animated: between 0-15 seconds or Flash. |

TABLE 1-continued

| Attribute | Description |
|---|---|
| Bids | For each bid in the auction, see the bid's rank in the auction, creative name and identifier, buyer name and identifier, and brand name and identifier. |

Figure 5D:
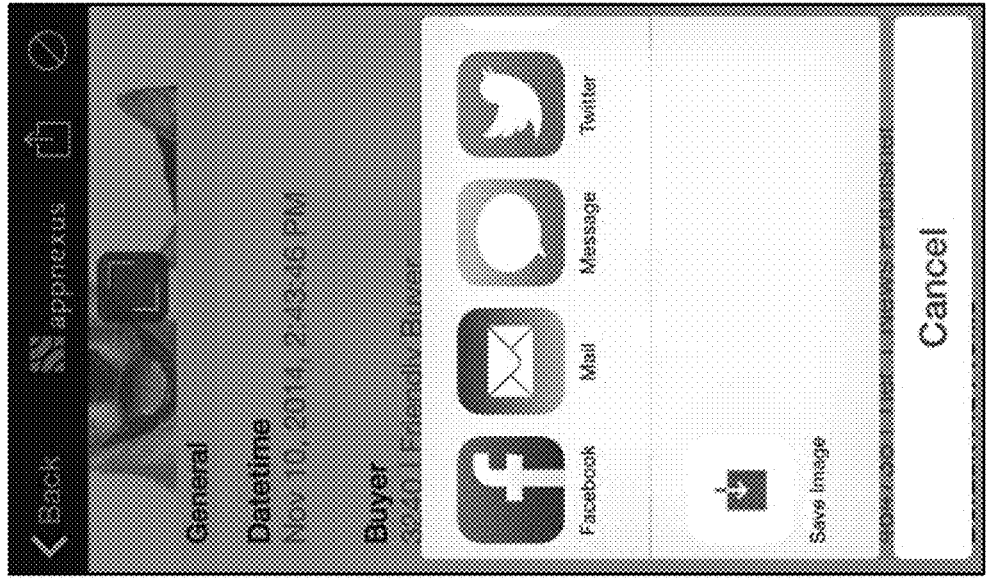
Figure 5C:
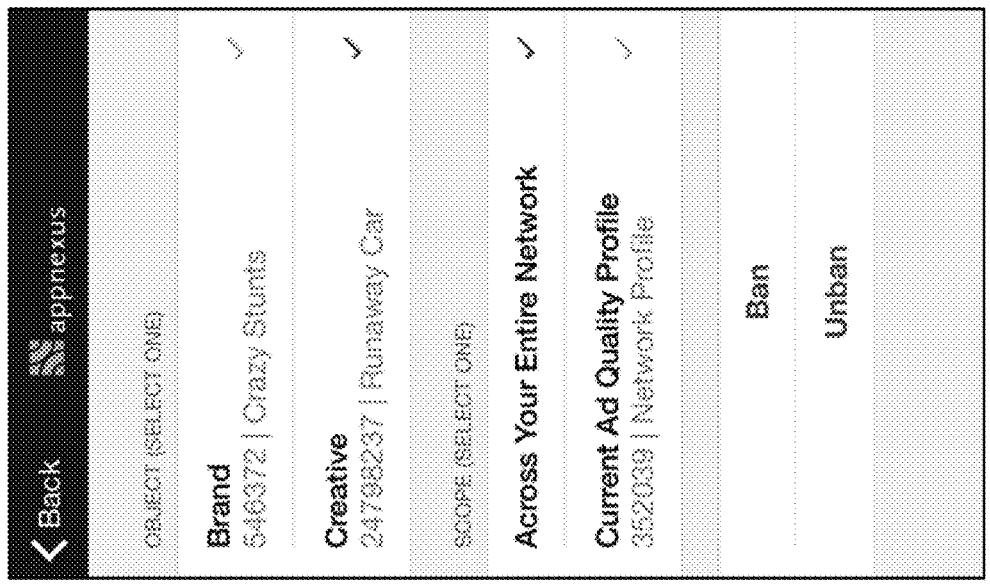

FIG. 5C depicts an interface screen 500C through which an impression seller can ban or unban a particular creative or brand from being served in the future. The seller can specify a broad scope for the ban/unban; for instance, the seller can specify that the ban/unban apply across the seller's entire network (i.e., over all the seller's impression inventory). The seller can also specify that the ban/unban be applied to a particular ad quality profile. For example, the seller can specify that the ad quality profile that the seller currently has in place should include the particular banned or allowed creative or brand. Referring to FIG. 5D, a sharing interface screen 500D allows a user to send information about a selected creative via email, text message, or sharing mechanisms available on the user device 10. For example, the creative detail can be shared with other users via a Facebook® or Twitter® sharing interface. The image associated with the creative can also be saved or shared by the user.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
receiving, by a processing system including a processor, a request for an advertisement to be served to a plurality of user devices;
receiving, by the processing system, in response to the request, metadata associated with the advertisement, including receiving encrypted metadata;
receiving, by the processing system, from a verified user, access information including a password uniquely identifying the verified user, wherein the verified user is one of an impression buyer and an impression seller;
decrypting, by the processing system, the encrypted metadata using the password uniquely identifying the verified user to decrypt the encrypted metadata, producing displayed ad metadata;
retrieving, by the processing system, advertising data from stored data associated with a number of advertisements previously displayed on the plurality of user devices, the advertising data including stored screenshots of advertisements of the number of advertisements including a visual indication of how the number of advertisements were displayed on the plurality of user devices;
providing, by the processing system, a graphical user interface to be displayed on a user device of the verified user, wherein the providing comprises:
displaying on the graphical user interface a visual history of advertisements previously displayed by the plurality of user devices of the number of advertisements previously displayed;
receiving, by the processing system from the graphical user interface, a user selection by the verified user of a selected advertisement of the visual history of advertisements previously displayed;
displaying, by the processing system, a visual representation of the selected advertisement, wherein the visual representation of the selected advertisement is captured by one or more of the plurality of user devices, wherein the visual representation includes the selected advertisement, as the advertisement was displayed by the plurality of user devices including information about context, positioning, sizing, formatting, or a combination of these, as the selected advertisement was presented by the plurality of user devices so the verified user can see how the selected advertisement was displayed on a particular user device:
displaying, by the processing system, to the verified user in the graphical user interface, the displayed ad metadata associated with the selected advertisement, wherein the displaying the displayed ad metadata comprises:
displaying information about a source that served the selected advertisement;
displaying information about the request for an advertisement to be served, the information about the request to be served including a request identifier associated with the request;
displaying information about markup language for the advertisement to be served;
wherein the displaying the displayed ad metadata enables diagnosis of incorrect display of the selected advertisement and correction of a future display of the selected advertisement; and
wherein the displaying the displayed ad metadata further comprises
displaying first metadata responsive to the verified user being an impression seller,
displaying second metadata responsive to the verified user being an impression buyer,
wherein at least some of the first metadata is different from the second metadata;
providing, by the processing system, an interface control configured to allow the verified user to ban the advertisement from being displayed on the plurality of user devices;
receiving, from the verified user, an indication to report the request identifier associated with the request to a developer associated with the selected advertisement for correction of the future display of the selected advertisement;
communicating the request identifier to the developer associated with the selected advertisement; and
in response to receiving an interaction with the interface control to ban the advertisement, sending, by the processing system an instruction to an advertising platform to prevent the advertisement from being served.

2. The method of claim 1, wherein the user device of the verified user comprises a mobile device.

3. The method of claim 1, further comprising providing for display, by the processing system in the graphical user interface, a date and time at which an auction occurred, a purchaser of an impression, a seller of an impression, or all of these.

4. The method of claim 1, wherein the visual representation comprises a screenshot including the advertisement and at least a portion of an area surrounding the advertisement.

5. The method of claim 1, wherein the visual representation of the advertisement is automatically captured after a fixed delay.

6. The method of claim 1, wherein a software development kit is configured to capture the visual representation.

7. The method of claim 1, further comprising:
receiving, at the processing system from the user device of the verified user, an indication of an interaction from the verified user; and
enabling, by the processing system, the graphical user interface in response to the interaction.

8. The method of claim 7, wherein the interaction comprises at least one of a gesture on a touch-based input device and a selection of an interface control graphically overlaid on the advertisement.

9. The method of claim 1, wherein the providing for display, in the graphical user interface, the metadata associated with the advertisements previously presented by the plurality of user devices, comprises providing for display information about advertisement creatives being served on an inventory of impressions of the verified user, wherein the verified user is an impression seller.

10. The method of claim 1, wherein the interface control is further configured to allow the verified user to ban other advertisements associated with a brand of the advertisement from being displayed on the plurality of user devices.

11. A system comprising:
a processing system including a processor, the processing system configured to perform operations comprising:
receiving, by the processing system, a request for an advertisement to be served to a plurality of user devices;
receiving, by the processing system, in response to the request, encrypted metadata associated with the advertisement, the encrypted metadata including a respective unique identifier for each respective impression of the advertisement;
receiving, by the processing system, from a verified user, access information including a password uniquely identifying the verified user, wherein the verified user is one of an impression buyer and an impression seller;
decrypting, by the processing system, the encrypted metadata, producing displayed ad metadata;
providing, by the processing system, for display on a user device of the verified user, a graphical user interface comprising a visual history of advertisements previously displayed by the plurality of user devices, including a visual representation of the advertisement, wherein the visual representation of the advertisement is captured by one or more of the plurality of user devices, wherein the visual representation includes the advertisement, as the advertisement was presented by the plurality of user devices including information about context, positioning, sizing, formatting or a combination of these, wherein the visual representation is stored at the user device of the verified user;
receiving, from the verified user, a selection of a selected advertisement of the visual history of advertisements previously displayed by the plurality of user devices;
displaying in the graphical user interface, displayed ad metadata associated with the advertisements previously displayed by the user device,
wherein the displaying the displayed ad metadata comprises
displaying information about a source that served the selected advertisement,
displaying information about the request for an advertisement to be served, the information about the request including a request identifier associated with the request,
displaying information about markup language for the advertisement to be served,
wherein the displaying the displayed ad metadata enables diagnosis of incorrect display of the selected advertisement and correction of a future display of the selected advertisement; and
wherein the displaying the displayed ad metadata further comprises
displaying the respective unique identifier associated with each respective impression of the advertisements previously displayed, and
displaying first metadata responsive to the verified user being an impression seller, and
displaying second metadata responsive to the verified user being an impression buyer,
wherein at least some of the first metadata is different from the second metadata;
providing, by the processing system, to the user device of the verified user, an interface control configured to allow the verified user to ban the advertisement from being displayed on the plurality of user devices, responsive to the verified user being an impression seller, wherein the providing an interface control comprises retrieving an ad profile for the advertisement, wherein the ad profile stores a status value and wherein the status value has a default value of trusted allowing the advertisement to be served, and wherein the interface control allows the impression seller to change the status value from the default value to a status value of banned preventing the advertisement from being served;
receiving, from the verified user, an indication to report the request identifier associated with the request to a developer associated with the selected advertisement for correction of the future display of the selected advertisement;
communicating the request identifier to the developer associated with the selected advertisement; and
in response to receiving, by the processing system from the user device an interaction with the interface control to ban the advertisement, sending, by the processing system an instruction to an advertising platform to prevent the advertisement from being served.

12. The system of claim 11, wherein the user device of the verified user comprises a mobile device.

13. The system of claim 11, further comprising causing, by the processing system, the user device of the verified user to display a date and time at which an auction occurred, a purchaser of an impression, a seller of an impression, or all of these.

14. The system of claim 11, wherein the visual representation comprises a screenshot including the advertisement and at least a portion of an area surrounding the advertisement.

15. The system of claim 11, wherein the visual representation of the advertisement is automatically captured after a fixed delay.

16. The system of claim 11, wherein the operations further comprise:
   receiving, at the user device of the verified user, an interaction from the verified user; and
   enabling the graphical user interface in response to the interaction.

17. The system of claim 16, wherein the interaction comprises at least one of a gesture on a touch-based input device and a selection of an interface control graphically overlaid on the advertisement.

18. The system of claim 11, wherein the providing for display metadata associated with the advertisements previously presented by the plurality of user devices comprises providing for display information about advertisement creatives being served on an inventory of impressions of verified user, responsive to the verified user being an impression seller.

19. The system of claim 11, wherein the interface control is further configured to allow the verified user to ban other advertisements associated with a brand of the advertisement from being displayed on a plurality of user devices, responsive to the verified user being an impression seller.

20. A non-transitory, machine-readable storage medium, comprising executable instructions, which when executed by a processor of a processing system, causes the processor to facilitate performance of operations, the operations comprising:
   receiving from a verified user, access information including a password uniquely identifying the verified user, wherein the verified user is one of an impression buyer and an impression seller;
   requesting an advertisement to be served to a plurality of user devices;
   receiving, in response to the requesting the advertisement, metadata associated with the advertisement, including receiving encrypted metadata;
   decrypting the encrypted metadata using the password uniquely identifying the verified user, producing displayed ad metadata;
   producing a graphical user interface on a user device of the verified user, the graphical user interface comprising a visual history of advertisements previously displayed by the plurality of user devices, including a visual representation of the advertisement, wherein the visual representation of the advertisement is captured by one or more of the plurality of user devices, wherein the visual representation includes the advertisement, as the advertisement was presented by the plurality of user devices including information about context, positioning, sizing formatting or a combination of these, wherein the visual representation is stored at the user device of the verified user;
   receiving, from the verified user, a selection of a selected advertisement of the visual history of advertisements previously displayed by the plurality of user devices;
   displaying in the graphical user interface, the displayed ad metadata associated with the selected advertisement, wherein the producing for display the displayed ad metadata comprises
      displaying information about a source that served the selected advertisement;
      displaying information about the request for an advertisement to be served, the information about the request to be served including a request identifier associated with the request;
      displaying information about markup language for the advertisement to be served;
      wherein the displaying the displayed ad metadata enables diagnosis of incorrect display of the selected advertisement and correction of a future display of the selected advertisement;
   displaying a respective unique identifier associated with each respective impression of the advertisement as the advertisement was served to the plurality of user devices, and
      displaying first metadata responsive to the verified user being an impression seller, and
      displaying second metadata responsive to the verified user being an impression buyer,
      wherein at least some of the first metadata is different from the second metadata;
   responsive to the verified user being an impression seller, providing, to the user device of the verified user, an interface control configured to allow the verified user to ban the advertisement from being displayed on the plurality of user devices, wherein the providing an interface control comprises retrieving an ad profile for the advertisement, wherein the ad profile stores a status value and wherein the status value has a default value of trusted allowing the advertisement to be served, and wherein the interface control allows the verified user to change the status value from the default value to a status value of banned preventing the advertisement from being served;
   receiving, from the verified user, an indication to report the request identifier associated with the request to a developer associated with the selected advertisement for correction of the future display of the selected advertisement;
   communicating the request identifier to the developer associated with the selected advertisement; and
   in response to receiving from the user device of the verified user an indication an interaction with the interface control to ban the advertisement, sending an instruction to an advertising platform to prevent the advertisement from being served.

\* \* \* \* \*